United States Patent [19]
Robinson

[11] Patent Number: 6,157,477
[45] Date of Patent: Dec. 5, 2000

[54] BIDIRECTIONAL DISPERSION COMPENSATION SYSTEM

[75] Inventor: Andrew Niall Robinson, McKinney, Tex.

[73] Assignee: MCI Communications Corporations, Washington, D.C.

[21] Appl. No.: 09/085,368

[22] Filed: May 27, 1998

[51] Int. Cl.⁷ .................................................. H04B 10/18
[52] U.S. Cl. .......................... 359/161; 359/130; 359/173; 385/37
[58] Field of Search .................................... 359/130, 161, 359/173; 385/37

[56] References Cited

U.S. PATENT DOCUMENTS

| | | | |
|---|---|---|---|
| 5,404,413 | 4/1995 | Delavaux | 359/130 |
| 5,701,188 | 12/1997 | Shigematsu et al. | 359/161 |
| 5,742,416 | 4/1998 | Mizrahi et al. | 359/130 |
| 5,943,151 | 8/1999 | Grasso et al. | 359/130 |

*Primary Examiner*—Leslie Pascal

[57] ABSTRACT

A bidirectional chromatic dispersion system includes an optical circulator that includes four ports. A first port is coupled to a first optical transmission medium and a third port is coupled to the second optical transmission medium. A first dispersion compensating grating is coupled to a second port, and a second dispersion compensating grating is coupled to a fourth port. The first dispersion compensating grating is operative to reflect wavelengths in a first optical band, and the second dispersion compensating grating is operative to reflect wavelengths in a second optical band. The first dispersion compensating grating is substantially transparent to wavelengths in the second optical band, and the second dispersion compensating grating is substantially transparent to wavelengths in the first optical band. The first dispersion compensating grating is coupled to the second port of the optical circulator through the second dispersion compensating grating and a dispersion compensating fiber. Similarly, the second dispersion compensating grating is coupled to the fourth port through the first dispersion compensating grating and the dispersion compensating grating.

4 Claims, 1 Drawing Sheet

BIDIRECTIONAL DISPERSION COMPENSATION SYSTEM

FIELD OF THE INVENTION

The present invention relates generally to dispersion compensation in optical communications systems and more particularly to a dispersion compensation system for use in a bidirectional optical communications system.

DESCRIPTION OF THE PRIOR ART

In a long optical fiber communications link, chromatic dispersion of the fiber media causes portions of an intensity modulated signal to arrive at the receiver at slightly different times. This temporal pulse distortion leads to intersymbol interference and effectively limits the modulation bandwidth available through the fiber. The dispersion experienced through a given fiber is proportional to both the wavelength carried and the length of the fiber.

A typical single mode fiber will exhibit a dispersion of about 17 picoseconds per nanometer per kilometer (ps/nm-km) at a wavelength of 1545 nanometers. The dispersion changes with a positive slope of about 0.09 ps/nm-km per nm as the carrier wavelength is varied. Thus, at wavelength 1560 nm, the same typical fiber would have a dispersion of about 18.4 ps/nm-km.

One solution to the high dispersion characteristics of typical fibers at currently used wavelengths involves the use of dispersion shifted fiber. Dispersion shifted fiber is constructed so as to have nearly zero dispersion at a wavelength of about 1550 nm. However, dispersion shifted fiber still has a delay slope, which results in nonzero dispersion values at all other wavelengths. Thus, dispersion shifted fiber offers only limited relief in a multi-wavelength environment.

A substantial amount of existing fiber is of the nondispersion shifted variety. Engineers have sought ways to expand the usefulness of these installed fibers rather than replacing them. One common technique is to incorporate dispersion compensation into the regenerative devices that are spaced along the fiber path. For this purpose, a special dispersion compensating fiber (DCF) has been developed. One commonly available form of dispersion compensating fiber has a dispersion of −80 ps/nm-km at a wavelength of 1545 nm and a negative slope of −0.15 ps/nm-km. Specific lengths of DCF can be inserted periodically into a fiber system to reduce the dispersion effects.

Another way of performing dispersion compensation involves the use of a Bragg grating or dispersion compensating grating. A dispersion compensating grating is a length of fiber in which the index of refraction of the fiber varies at selected spacings along the length of the fiber, which causes selective reflection of wavelengths that are congruent to the grating spacing. For dispersion compensation, this effect is employed by preparing a "chirped" fiber Bragg grating that has gradually increased spacings along its length. This causes shorter wavelengths to travel further down the dispersion compensating fiber before being reflected. Therefore, shorter wavelengths will experience longer travel times. By the appropriate selection of length and range of spacings, a dispersion compensating grating can be customized to compensate for a given dispersion characteristic. A relatively short dispersion compensating grating can replace tens of kilometers of dispersion compensating fiber.

In Shigematsu, et al. U.S. Pat. No. 5,701,188, there is disclosed a chromatic dispersion compensator that combines dispersion compensating fiber with dispersion compensating grating. The chromatic dispersion compensator of the '188 patent includes an optical circulator having first, second, and third ports. An input transmission path is connected to the first port and an output transmission path is connected to the third port. A dispersion compensating grating is coupled to the second port through a length of dispersion compensating fiber. The dispersion compensating fiber and the dispersion compensating grating have chromatic dispersion characteristics that are opposite from the chromatic dispersion characteristics of the input and output transmission paths. Optical signals received at the first port of the optical circulator are output to the dispersion compensating fiber and dispersion compensating grating at the second port. The signal undergoes dispersion compensation as it travels along the dispersion compensating fiber and as it interacts with the dispersion compensating grating. The dispersion compensating grating effectively reflects the signal back through the dispersion compensating fiber to the second port. The compensated signal received at the second port is output to the output transmission path at the third port. The chromatic dispersion compensator of the '188 patent reduces by half the required length of dispersion compensating fiber. Additionally, the compensation provided by the dispersion compensating grating reduces substantially the length of the dispersion compensating grating necessary to achieve compensation.

Currently, there is substantial interest in bidirectional optical communication systems, in which optical signals are transmitted simultaneously in opposite directions over the same optical fiber transmission path. It is an object of the present invention to provide a dispersion compensating device for use in a bidirectional optical system.

SUMMARY OF THE INVENTION

The system of the present invention provides bidirectional chromatic dispersion compensation to a first optical signal carried in a first direction from a first optical transmission medium to a second optical transmission medium and a second optical signal carried in a direction opposite the first direction from the second optical transmission medium to the first optical transmission medium. The system of the present invention includes an optical circulator that includes four ports. A first port is coupled to the first optical transmission medium and the third port is coupled to the second optical transmission medium. A first dispersion compensating grating is coupled to the second port, and a second dispersion compensating grating is coupled to the fourth port.

The first optical signal is carried in a first optical band and the second optical signal is carried in a second optical band. The first dispersion compensating grating is operative to reflect wavelengths in the first optical band, and the second dispersion compensating grating is operative to reflect wavelengths in the second optical band. The first dispersion compensating grating is substantially transparent to wavelengths in the second optical band, and the second dispersion compensating grating is substantially transparent to wavelengths in said first optical band. The first dispersion compensating grating is coupled to the second port of the optical circulator through the second dispersion compensating grating and a dispersion compensating fiber. Similarly, the second dispersion compensating grating is coupled to the fourth port through the first dispersion compensating grating and the dispersion compensating grating.

DESCRIPTION OF THE PREFERRED EMBODIMENT

Figure 1:
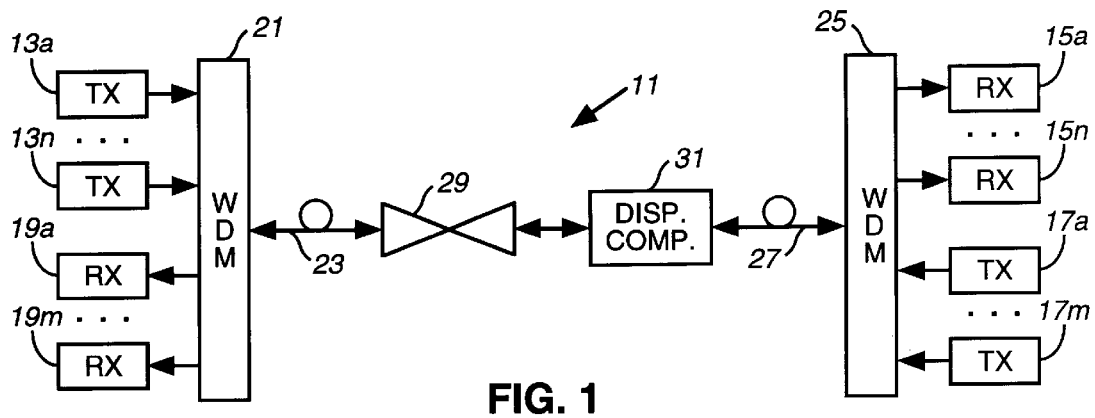
FIG. 1 is a block diagram of a bidirectional optical communications system according to the present invention.

Referring now to the drawings, and first to FIG. 1, an optical system according to the present invention is designated generally by the numeral 11. System 11 is bidirectional in that signals from West to East are transmitted simultaneously with signals from East to West over the same optical transmission facilities. System 11 includes one or more West-East optical transmitters 13 and a corresponding number of optical receivers 15. Each West-East transmitter receiver pair operates on a unique wavelength. According to the present invention, the West-East transmitters 13 operate in a first band of wavelengths.

System 11 also includes one or more East-West optical transmitters 17 and a corresponding number of optical receivers 19. Again, each East-West transmitter receiver pair operates on a unique wavelength and the East-West wavelengths are grouped into a second band of wavelengths that is different from the West-East band of wavelengths. For example, the East-West band may be at the lower end of the 1530 nm to 1565 nm "Erbium band" (e.g. 1530 nm to 1545 nm) and the West-East band may be at the upper end (e.g. 1550 nm to 1560 nm).

System 11 includes a first wavelength division multiplexor 21. First wavelength division multiplexor 21 multiplexes the signals of the West-East transmitters 13 onto a single fiber optic transmission medium 23. Wavelength division multiplexor 21 also demultiplexes East-West signals received on optical fiber transmission medium 23 to East-West receivers 19. System 11 also includes a second wavelength division multiplexor 25 that is connected to an optical fiber transmission medium 27. Wavelength division multiplexor 25 multiplexes East-West signals from transmitters 17 and demultiplexes West-East signals to receivers 15.

System 11 includes at least one bidirectional optical amplifier 29 that is coupled to optical fiber transmission medium 23. Bidirectional optical amplifier 29 is coupled to a bidirectional dispersion compensating device 31. The construction and operation of bidirectional dispersion compensating device 31 will be described in detail hereinafter. Dispersion compensating device 31 is coupled to optical fiber transmission medium 27. In FIG. 1, only a single optical amplifier 29 and bidirectional dispersion compensating device 31 are illustrated. In actual practice, several optical amplifiers and bidirectional dispersion compensating devices might be positioned along the path between the transmitters and the receivers.

Figure 2:
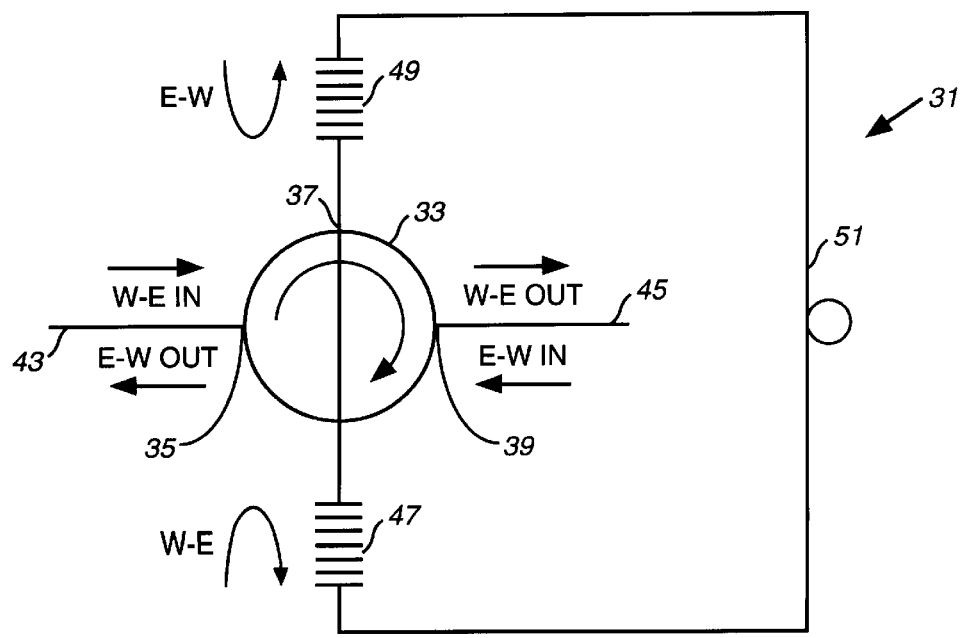
FIG. 2 is a block diagram of a bidirectional chromatic dispersion compensating device according to the present invention.

Referring now to FIG. 2, there is shown a bidirectional dispersion compensating device 31. Compensating device 31 includes an optical circulator 33. Circulator 33 includes a first port 35, a second port 37, a third port 39, and a fourth port 41. First port 31 is coupled to a first optical fiber transmission medium 43, and third port 39 is coupled to a second optical transmission medium 45. Optical fiber transmission medium 43 carries an inbound West-East signal and an outbound East-West signal. Optical transmission medium 45 carries an outbound West-East signal and an inbound East-West signal.

Compensating device 31 includes a first dispersion compensating grating 47 and a second dispersion compensating grating 49. First dispersion compensating grating 47 is selected to reflect wavelengths in the West-East band, but to be transparent to wavelengths in the East-West band. Similarly, second dispersion compensating grating 49 is selected to reflect wavelengths in the East-West band, but to be transparent to wavelengths in the West-East band.

First dispersion compensating grating 47 and second dispersion compensating grating 49 are coupled together through an appropriate length of dispersion compensating fiber 51. First dispersion compensating grating 47 is coupled to second port 37 of optical circulator 33 through dispersion compensating fiber 51 and second dispersion compensating grating 49. Similarly, second dispersion compensating grating 49 is coupled to fourth port 41 of optical circulator 33 through dispersion compensating grating 51 and first dispersion compensating grating 47.

In operation, inbound West-East signals are received at first port 35 of optical circulator 33. Those signals are output at second port 37. Since second dispersion compensating grating 49 is transparent to wavelengths in the West-East band, those wavelengths pass through second dispersion compensating grating 49 and into dispersion compensating fiber 51 to undergo a first measure of dispersion compensation. The wavelength components of the West-East signal are selectively and time differentially reflected in first dispersion compensating grating 47 to achieve a second measure of dispersion compensation. The reflected signal travels back through dispersion compensating fiber 51 where it undergoes a third measure of dispersion compensation. The reflected West-East signals pass through second dispersion compensating grating 49 and re-enter optical circulator 33 at second port 37. The outbound West-East signal exits optical circulator 33 at third port 9.

Similarly, an inbound East-West signal is received at third port 39 of optical circulator 33. The East-West signal exits optical circulator 33 at fourth port 41. Since first dispersion compensating grating 47 is transparent to wavelengths in the East-West band, those wavelengths travel through first dispersion compensating grating 47 and into dispersion compensating fiber 51. The wavelengths of the East-West signal are reflected and undergo dispersion compensation in second dispersion compensating grating 49. The reflected East-West signals travel back through dispersion compensating fiber 51 and first dispersion compensating grating 47 to re-enter optical circulator 33 at fourth port 41. An outbound East-West signal exits optical circulator 33 at first port 35.

From the foregoing it may be seen that the present invention provides dispersion compensation in a bidirectional system. The present invention uses a single optical circulator and a single length of dispersion compensating fiber to provide dispersion compensation in both directions. Moreover, the combination of the dispersion compensating gratings of the present invention reduces by half the required length of dispersion compensating fiber.

What is claimed is:

1. A system for providing chromatic dispersion compensation to a first optical signal carried in a first optical band in a first direction from a first optical transmission medium to a second optical transmission medium and a second optical signal carried in a second optical band in a direction opposite said first direction from said second optical transmission medium to said first optical transmission medium, which comprises:

an optical circulator including a first port, a second port, a third port, and a fourth port, said first port being coupled to said first optical transmission medium and said second port being coupled to said second optical transmission medium;

a first dispersion compensating grating coupled to said second port, said first dispersion compensating grating being operative to reflect wavelengths in said first optical band, and said first dispersion compensating grating being substantially transparent to wavelengths in said second optical band;

a second dispersion compensating grating coupled to said fourth port, said second dispersion compensating grating being operative to reflect wavelengths in said second optical band, and said second dispersion compensating grating being substantially transparent to wavelengths in said first optical band; and, means for coupling said first dispersion compensating grating to said second dispersion compensating grating.

2. The system as claimed in claim 1, wherein said means for coupling said first dispersion compensating grating to said second dispersion compensating grating includes:

a dispersion compensating fiber coupled between said first dispersion compensating grating and said second dispersion compensating grating.

3. A bidirectional chromatic dispersion compensation apparatus, which comprises:

an optical circulator including a first port a second port, a third port, and a fourth port, said first port adapted to be coupled to a first optical transmission medium and said second port adapted to be coupled to a second optical transmission medium;

a first dispersion compensating grating coupled to said second port, said first dispersion compensating grating being operative to reflect wavelengths in a first optical band, and said first dispersion compensating grating being substantially transparent to wavelengths in a second optical band;

a second dispersion compensating grating coupled to said fourth port, said second dispersion compensating grating being operative to reflect wavelengths in said second optical band, and said second dispersion compensating grating being substantially transparent to wavelengths in said first optical band; and, means for coupling said first dispersion compensating grating to said second dispersion compensating grating includes:

a dispersion compensating fiber coupled between said first dispersion compensating grating and said second dispersion compensating grating.

4. An optical communication system, which comprises:

a first optical transmission medium;

a second optical transmission medium;

an optical circulator including a first port, a second port, a third port, and a fourth port, said first port being coupled to said first optical transmission medium and said second port being coupled to said second optical transmission medium;

a first dispersion compensating grating coupled to said second port, said first dispersion compensating grating being operative to reflect wavelengths in a first optical band, and said first dispersion compensating grating being substantially transparent to wavelengths in a second optical band;

a second dispersion compensating grating coupled to said fourth port, said second dispersion compensating grating being operative to reflect wavelengths in said second optical band, and said second dispersion compensating grating being substantially transparent to wavelengths in said first optical band; and, a dispersion compensating fiber coupled between said first dispersion compensating fiber and said second dispersion compensating fiber.

* * * * *